April 7, 1942.   L. G. HURLEY   2,279,120
AUTOMOBILE CHASSIS
Filed June 5, 1939   2 Sheets-Sheet 1
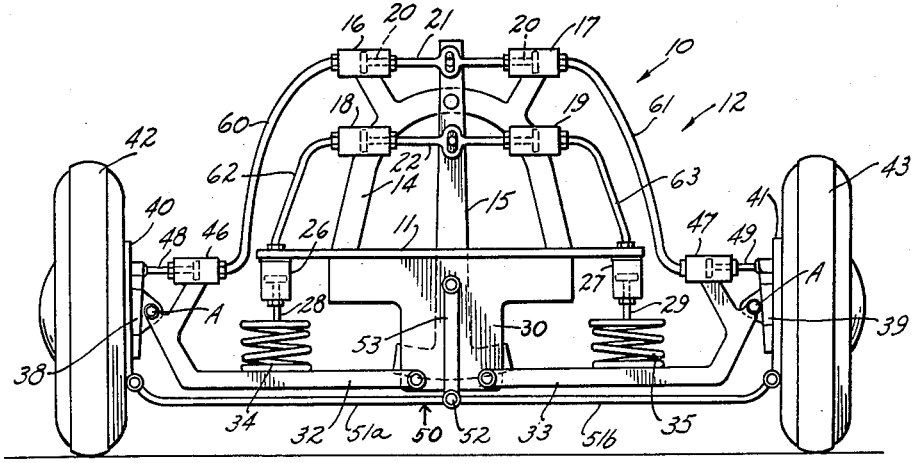
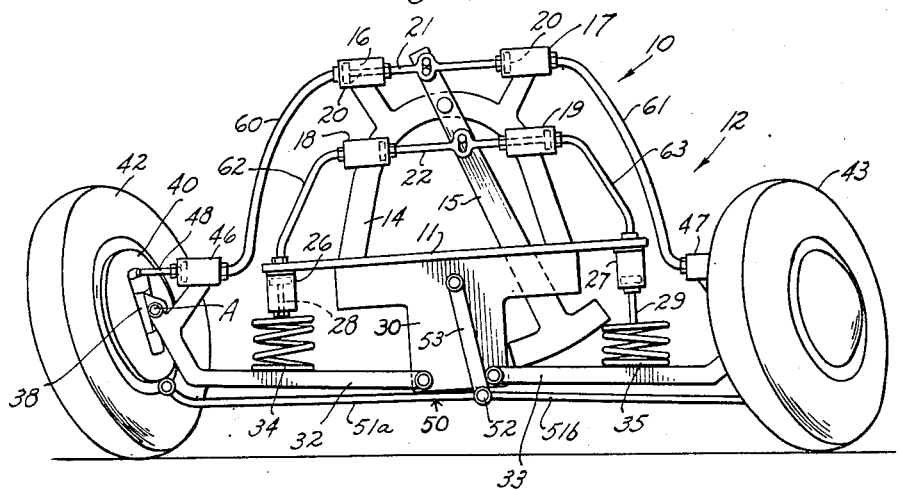
INVENTOR.,
Lon G. Hurley,
BY
ATTORNEY.

April 7, 1942.   L. G. HURLEY   2,279,120
AUTOMOBILE CHASSIS
Filed June 5, 1939   2 Sheets-Sheet 2

INVENTOR.,
Lon G. Hurley,
BY Hubert A. Huebner
ATTORNEY.

Patented Apr. 7, 1942

2,279,120

UNITED STATES PATENT OFFICE 2,279,120

AUTOMOBILE CHASSIS

Lon G. Hurley, Inglewood, Calif., assignor to James Dobson Altemus, Roslyn, N. Y.

Application June 5, 1939, Serial No. 277,426

6 Claims. (Cl. 280—124)

This is a continuation in part of my copending application Serial No. 217,676, filed July 6, 1938.

My invention relates to the automotive art and particularly to fuselages.

In present day motor car construction the plane in which each wheel revolves is always maintained in a fixed angular relation with the plane determined by the lowermost points of all the wheels. The frame is also supported upon the axles by springs with the net effect of causing the frame to rock towards the outside of any curve about which the vehicle is being operated thus shifting the center of gravity of the load also towards the outside. In a passenger vehicle this is uncomfortable for the passengers and in any vehicle increases the tendency of the centrifugal force created to overturn the vehicle.

The same features of construction noted have similar results when travelling over a fairly steep lateral slope as on a sharply crowned highway. The center of gravity of the load shifts toward the low side of the vehicle increasing the tendency of the latter to skid or overturn.

It is a principal object of my invention to eliminate the defects aforementioned in present day vehicular construction.

It is another object of my invention to provide a vehicular construction which will decrease the strain on the wheels of an automobile when going around a turn at high speed, thereby eliminating accidents arising from the buckling of wheels.

Yet another object of my invention is to provide an automobile chassis which will greatly increase the comfort of the passengers in an automobile and the ease of controlling the latter.

The manner of accomplishing the foregoing objects as well as other objects and advantages will be made manifest in the following description taken together with the accompanying drawings in which:

Fig. 1 is a diagrammatic elevational view from the front of the steering wheel assembly of my invention with the wheels disposed vertically and with the frame parallel with the surface on which the wheels are resting.

Fig. 2 is a view similar to Fig. 1 and showing the same mechanism with the wheels tilted laterally thereby, and with the wheels turned about the steering knuckles as in steering, and with the frame inclined in the same direction as the wheels are tilted.

Figure 3:
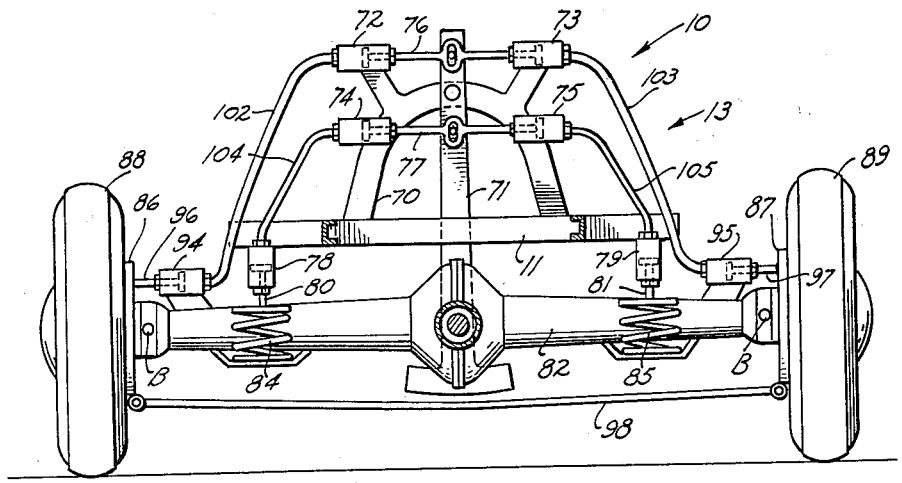
Fig. 3 is a diagrammatic elevational view from the front of the drive wheel assembly of my invention with the wheels disposed vertically and with the frame parallel with the surface on which the wheels are resting.

Referring specifically to the drawings, a chassis 10 is there illustrated diagrammatically as embodying my invention. This chassis includes a frame 11 on opposite ends of which are mounted a steering wheel assembly 12 and a drive wheel assembly 13.

The steering wheel assembly 12 includes a pendulum supporting yoke 14 which is provided on the frame 11 and which pivotally supports a pendulum 15. Also provided upon the yoke 14 are hydraulic cylinders 16, 17, 18 and 19 having pistons 20 on rods 21 and 22, the latter being actuated by pin and slot connections with the pendulum 15.

Fixed on the frame 11 are hydraulic cylinders 26 and 27 from the pistons of which piston rods 28 and 29 extend downwardly. Pivotally suspended from a downward extension 30 of the frame 11 are knee-action axle arms 32 and 33 having springs 34 and 35 respectively, the upper ends of which connect with the piston rods 28 and 29.

Pivoted on horizontal longitudinal axes A on the outer extremities of the arms 32 and 33 are steering spindles 38 and 39 on which front axle and brake units 40 and 41 of wheels 42 and 43 are mounted pivotally to permit the steering of said wheels.

Provided on the arms 32 and 33 are hydraulic cylinders 46 and 47, the pistons of which have piston rods 48 and 49 which have suitable pivotal connection with the upper ends of the steering spindles 38 and 39, respectively. Joining lower portions of the units 40 and 41 by ball and socket connections is a tie rod 50 which is formed in two sections 51a and 51b pivoted at 52 to a rigid link 53 pivotally suspended upon the frame 11.

Connecting the cylinders 16, 17, 18 and 19 to cylinders 46, 47, 26 and 27, respectively, are flexible hydraulic conduits 60, 61, 62 and 63.

The drive wheel assembly 13 includes, among other things, a pendulum suspension yoke 70 which is rigidly mounted upon the frame 11. Pivotally suspended from this yoke is a control pendulum 71. Fixed upon the yoke 70 are hydraulic cylinders 72, 73, 74 and 75, the pistons of which are provided, as shown, on opposite ends of two piston rods 76 and 77 which are adapted to be actuated by pin and slot connections with the pendulum 71.

Fixed on the frame 11 are hydraulic cylinders 78 and 79 from the pistons of which piston rods 80 and 81 extend downwardly. Disposed beneath the frame 11 is a drive axle housing 82 having springs 84 and 85 to which piston rods 80 and 81 connect as shown in Fig. 3.

Pivoted on horizontal longitudinal axes B on the outer extremities of the housing 82 and making a ball and socket connection therewith are rear wheel bearing and brake units 86 and 87. Pivotally mounted on said units are drive wheels 88 and 89, these wheels being driven through drive axles 90 having universal joints 91.

Fixed upon the housing 82 are hydraulic cylinders 94 and 95 the pistons of which have piston rods 96 and 97, outer ends of which pivotally connect with upper portions of the units 86 and 87, respectively. Lower portions of these units pivotally connect to opposite ends of a spacer rod 98.

Connecting the cylinders 72, 73, 74 and 75 to cylinders 94, 95, 78 and 79, respectively, are flexible hydraulic conduits 102, 103, 104 and 105.

The frame 11 of the chassis 10 is of course usually fitted with a motor and transmission for rotating the drive shaft 90, and with a body to accommodate the driver and either passengers or freight. When the chassis 10 is thus embodied in and part of a motor vehicle, and when the latter is standing on a level surface or being driven along a straight line on a level road, the mechanism of the steering and drive assemblies 12 and 13 of my invention are disposed as shown in Figs. 1 and 3. Here we see that the pedulums 15 and 71 are hanging vertically from their pivots and the pistons in all the hydraulic cylinders of the steering wheel assembly are disposed substantially in the middle of their respective cylinders. This holds the wheels 42 and 43 in vertical positions and permits the vehicle to be steered in the ordinary manner by a steering mechanism (not shown).

Likewise in the drive wheel assembly 13, the pistons in all the hydraulic cylinders are in the middle of these thereby holding the drive wheels 88 and 89 in vertical positions as shown in Fig. 3 though permitting these to be driven through the axles 90.

Figure 4:
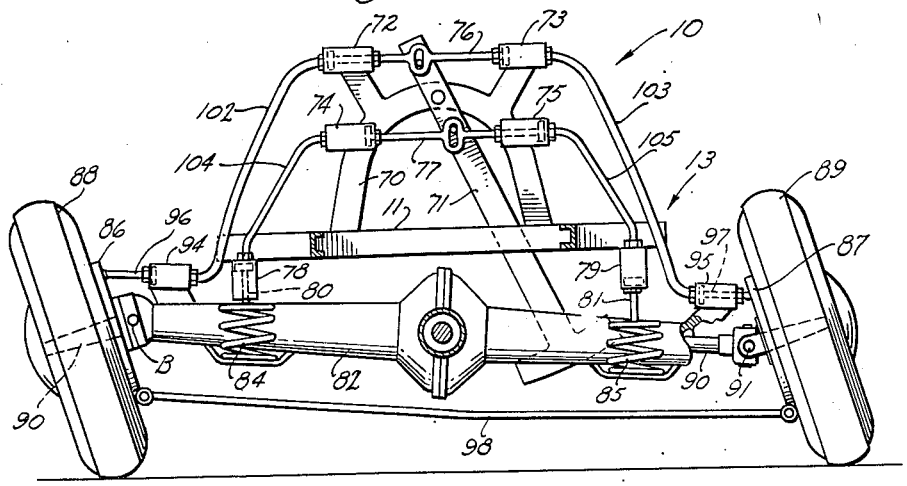
Fig. 4 is a view similar to Fig. 3 showing the drive wheels tilted laterally and the frame inclined in the same direction.

Now when the vehicle embodying the chassis 10 is driven at a considerable velocity around a curved portion of the road, as, for instance, in a rightward direction, requiring that the steering wheels 42 and 43 be turned as shown in Fig. 2, the pendulums 15 and 71 swing toward the outside of the curve thereby shifting the piston rods 21, 22, 76 and 77 and through the hydraulic connections between the various cylinders, tilting the wheels toward the inside of the curve and also inclining both front and rear ends of the frame 11 slightly towards the inside of said curve as shown in Figs. 2 and 4.

This shifts the center of gravity of the entire vehicle well inwardly from its normal relation with the points of contact between the wheels and the road. The tendency of centrifugal forces to upset the vehicle is thus nullified and the additional strains set up by those forces are applied to the wheels in the planes of rotation thereof instead of across these planes. Among the benefits resulting from the operation of my invention in this manner are the elimination of skidding by giving the tires a better "bite" on the road and applying the weight of the load to the tires in the planes of the wheels. This also eliminates buckling of the wheels and prolongs the life of the tires by increasing the wear area on the tread of the tire and spreading the wear uniformly over this area.

The comfort of the driver and passengers is also greatly increased in taking turns with a vehicle embodying my invention as the tendency of passengers to be thrown towards the outside of the curve is completely eliminated.

My invention also permits further refinements in automotive design by lowering the center of gravity below what was formerly practical. This is because, when turning with my invention, the vehicle does not tend to "float" over the surface of the road as is the case in standard design where the center of gravity is placed as low as engineers would like to place it.

Besides compensating for the centrifugal forces set up in driving around curves, my invention also adjusts the center of gravity of a vehicle to increase the safety and comfort of the driver and passengers when riding upon a surface with an appreciable lateral slope such as is the case on a sharply crowned highway. Where this condition is met with the pendulums 15 and 71 react to gravity to tilt the wheels and incline the frame much as shown in Figs. 2 and 4 so that the frame is kept substantially level and the center of gravity is maintained substantially midway between the vertical planes in which the wheels are tracking. This causes the tires to get a better bite into the road and distributes the weight uniformly on all the tires. Travel on a sharply crowned road thus becomes as comfortable and as safe as on a flat road.

From an inspection of Figures 3 and 4 it is obvious that my invention is applicable to front wheel suspension of the conventional axle type. In that case, the front axle would occupy the same relative position as rear axle housing 82, and the frame mounting would be similar to that shown in these Figures 3 and 4. A one piece tie rod should, in such instance, be used.

While I have shown and described coil springs for cushioning the frame, my invention may utilize semi-elliptic, cantilever, or air springs.

The pistons in cylinders 26, 27, 78 and 79 are shown as being normally positioned at about the vertical center of the cylinders. As an alternative, the adjustment may be altered so that these pistons normally seat against the upper end of the cylinders. Such an arrangement would relieve pressure on the hydraulic lines 62, 63, 104 and 105 when riding level.

What I claim is:

1. An automobile chassis comprising a frame, road-wheels, frame suspension means mounting the frame upon the wheels and means to bank the wheels in a direction opposite the direction of a side thrust comprising wheels spindles pivotally mounted upon the frame suspension means, hydraulic jacks on the said suspension means with control links attached to arms of the spindles at a distance from the pivots and adapted to fix and alter the angle of the spindles, a shiftable weight on the frame actuated by said thrust and returnable to a normal position by gravity, operating connections communicating movement of the weight to actuate the hydraulic jacks and a tie rod between wheels of a pair to insure a uniform banking of the wheels.

2. An automobile chassis comprising a frame, roadwheels, frame suspension means mounting the frame upon the wheels, and means to bank the wheels and shift the center of gravity of the frame in a direction opposite the direction of a side thrust comprising wheel spindles pivotally mounted upon the frame suspension means, hydraulic jacks on the said suspension means with control links attached to arms of the spindles at a distance from the pivots and adapted to fix and alter the angle of the spindles, a second series of hydraulic jacks in the frame suspension means supporting the frame and adapted to raise or lower either side of same, a shiftable weight on the frame actuated by side thrust, and operating connections communicating movement of the weight to actuate the hydraulic jacks selectively to bank the wheels and tilt the frame in a direction opposite the direction of shift of the weight.

3. A device as described in claim 2 in which the shiftable weight is a pivoted pendulum suspended on the frame.

4. A device as described in claim 2 in which the operating connections communicating movement of the weight to actuate the hydraulic jacks include hydraulic elements on the frame, and conduits between the hydraulic elements and the hydraulic jacks.

5. A device as described in claim 2 in which the second series of hydraulic jacks in the frame suspension means are mounted on springs to cushion the frame against road-shock.

6. An automobile chassis comprising a frame, road-wheels, frame suspension means mounting the frame upon the wheels and means to bank the wheels in a direction opposite the direction of a side thrust comprising wheel spindles pivotally mounted upon the frame suspension means, hydraulic jacks on the said suspension means with control links attached to arms of the spindles at a distance from the pivots and adapted to fix and alter the angle of the spindles, a shiftable weight on the frame actuated by said thrust and returnable to a normal position by gravity, operating connections communicating movement of the weight to actuate the hydraulic jacks, a tie rod between wheels of a pair to insure uniform banking of the wheels, the tie rod being in two sections pivoted together, and a link pivotally connected with the tie rod and pivotally suspended upon the frame.

LON G. HURLEY.